United States Patent [19]

Drewitz

[11] Patent Number: 5,439,093

[45] Date of Patent: Aug. 8, 1995

[54] APPARATUS FOR UNSCRAMBLING CONTAINERS

[75] Inventor: Hughes Drewitz, St-Eustache, Canada

[73] Assignee: H. G. Kalish Inc., Pointe-Claire, Canada

[21] Appl. No.: 191,128

[22] Filed: Feb. 3, 1994

[51] Int. Cl.[6] .............................................. B65G 47/24
[52] U.S. Cl. .................................. 198/399; 198/397; 198/408
[58] Field of Search ............... 198/375, 376, 377, 378, 198/379, 395, 399, 400, 401, 408, 470.1, 474.1, 475.1, 803.8

[56] References Cited

U.S. PATENT DOCUMENTS

| | | | |
|---|---|---|---|
| 3,297,132 | 1/1967 | Ripple | 198/399 X |
| 3,338,373 | 8/1967 | Aidlin et al. | 198/397 |
| 5,291,984 | 3/1994 | Lusetti | 198/408 |

Primary Examiner—James R. Bidwell
Attorney, Agent, or Firm—Jacobson, Price, Holman & Stern

[57] ABSTRACT

An apparatus for unscrambling a population of containers. The apparatus comprises an in-feed guide supplying containers in a random neck-leading and neck-trailing orientations to a carousel rotating about a horizontal axis. The carousel supports a plurality of container handling stations that transport individual containers from the in-feed guide to an output station, typically a conveyor belt. During the transport between the in-feed guide and the conveyor belt the container handling stations alter the longitudinal orientation of selected containers so that all the containers dispensed on the conveyor belt acquire a uniform longitudinal orientation.

19 Claims, 10 Drawing Sheets

APPARATUS FOR UNSCRAMBLING CONTAINERS

FIELD OF THE INVENTION

The present invention relates to the art of handling containers in bulk and more particularly to an apparatus for unscrambling a population of containers. The apparatus finds applications in the product packaging industry to place randomly oriented moving containers into a uniform longitudinal disposition and to dispense the containers so oriented to a container filling device.

BACKGROUND OF THE INVENTION

Manufacturers of consumer products packaged in bottles, such as drugs, cosmetics or edible substances, make extensive use of automatic machinery to fill empty containers with the appropriate contents, cap the containers, apply a label, etc. A typical container processing machine comprises a plurality of processing stations performing specific operations on containers dispensed in succession from a supply bin. The containers in the supply bin are in a completely random disposition, hence a container orienting apparatus is required to unscramble and feed the containers to the processing line in a uniform disposition, typically the neck-up.

A number of devices for unscrambling a population of containers have been developed by the industry. The following U.S. patents illustrate the state of the art in this technological field.

| U.S. PAT. NO. | ISSUE DATE |
| --- | --- |
| 3,338,373 | August 29, 1967 |
| 4,257,516 | March 24, 1981 |
| 4,271,954 | June 9, 1981 |
| 4,463,846 | August 7, 1984 |
| 4,483,435 | November 20, 1984 |
| 4,615,428 | October 7, 1986 |
| 4,653,628 | March 31, 1987 |
| 5,009,305 | April 23, 1991 |

However, the devices described in the above U.S. patents suffer from numerous drawbacks, namely inefficiency, slow speed and undue complexity.

OBJECTIVE AND STATEMENT OF THE INVENTION

An object of the present invention is an apparatus for unscrambling a population of containers that is simple in construction, can operate at high speed and is relatively compact.

As embodied and broadly described herein, the invention provides an apparatus for successively unscrambling a population of containers, comprising:
- an in-feed station for receiving containers randomly arranged into one of at least two possible longitudinal orientations;
- a plurality of container handling stations in a spaced apart relationship movable along a common path of travel for transporting individual containers from said in-feed station to an output station and for altering the longitudinal orientation of selected containers during transport between said stations, each container handling station including:
  a) a first container engaging member;
  b) a second container engaging member movable relative said first container engaging member along a generally rectilinear path of travel between an extended position and a retracted position, in said extended position said second container engaging member clamping a container against said first container engaging member, in said retracted position said second container engaging member being spaced from said first container engaging member by a distance sufficient to release the container from the container handling station; and
  c) rotating means for rotating said container engaging members when said second container engaging member is in said extended position about an axis generally parallel with said rectilinear path of travel in order to alter the longitudinal orientation of the container held by said container engaging members, an inspection station along said common path of travel for sensing the longitudinal orientation of individual containers transported along said common path of travel, the rotating means of said container engaging members being responsive to an output condition of said inspection station to rotate selected ones of the containers to a predetermined longitudinal orientation, whereby the containers released at said output station have a uniform longitudinal orientation.

In a most preferred embodiment, the in-feed station includes a guide supplying empty containers in a random neck-leading or neck-trailing dispositions. The container handling stations are mounted on a vertically oriented carousel to pick-up individual containers from the guide and to transport the containers along a sector of a circle. During the travel, the containers are individually inspected to determine their longitudinal orientation. The containers found to be in the inverted condition are rotated by 180° so they all acquire a uniform orientation. The carousel dispenses the containers on a conveyor belt that transports the containers to the first processing station of a packaging line.

The carousel includes a pair of axially spaced circular plates holding the respective container engaging members of each container handling station. The guide supplying the randomly oriented containers extends between the circular plates. When a container handling station registers with the guide, one of the container engaging members, comprising a linear movement pneumatic actuator is extended to clamp the forward-most container in the guide against its companion container engaging member. The container, now grabbed by the container handling station, is gently removed from the guide and follows the course of the rotating carousel. At an inspection station, located along the path of travel of the container handling stations, the longitudinal orientation of the container is determined. If the container is found to be inverted then one of the container engaging members that includes a pneumatic semi-rotary actuator is rotated by half a turn in order to place the container in the proper orientation. The rotation is effected about an axis that coincides with the longitudinal axis of the linear actuator. In the situation when the container is found already in the proper orientation, no rotation is made. When the container reaches the conveyor belt, the linear movement actuator is retracted to release the container from the carousel.

As embodied and broadly described herein, the invention also provides an apparatus for unscrambling a population of containers, comprising:

an in-feed guide for directing along a predetermined path of travel containers randomly arranged into one of at least two possible longitudinal orientations;

a plurality of container handling stations in a spaced apart relationship movable along a common path of travel for transporting individual containers from said in-feed guide to an output station, each container handling station includes a pair of container engaging members capable of assuming either one of an opened condition and a closed condition, in said closed condition said container engaging members being in a close relationship for clamping a container therebetween, in said opened condition said container engaging members being separated by a distance sufficient to release the container from said container handling station, said in-feed guide extending between the container engaging members of respective container handling stations when the container handling stations register with said in-feed guide, whereby allowing the container handling stations to successfully grasp and remove containers from said guide by timed actuation of the respective container engaging members toward the closed condition, said container engaging members constituting means for altering the longitudinal orientation of selected containers during transport between said stations; and an inspection station along said common path of travel for sensing the longitudinal orientation of individual containers transported along said common path of travel, the container engaging members of said container handling stations being responsive to an output condition of said inspection station to place selected ones of the containers in a predetermined longitudinal orientation, whereby the containers released at said output station acquire an uniform longitudinal orientation.

DESCRIPTION OF A PREFERRED EMBODIMENT

Figure 1:
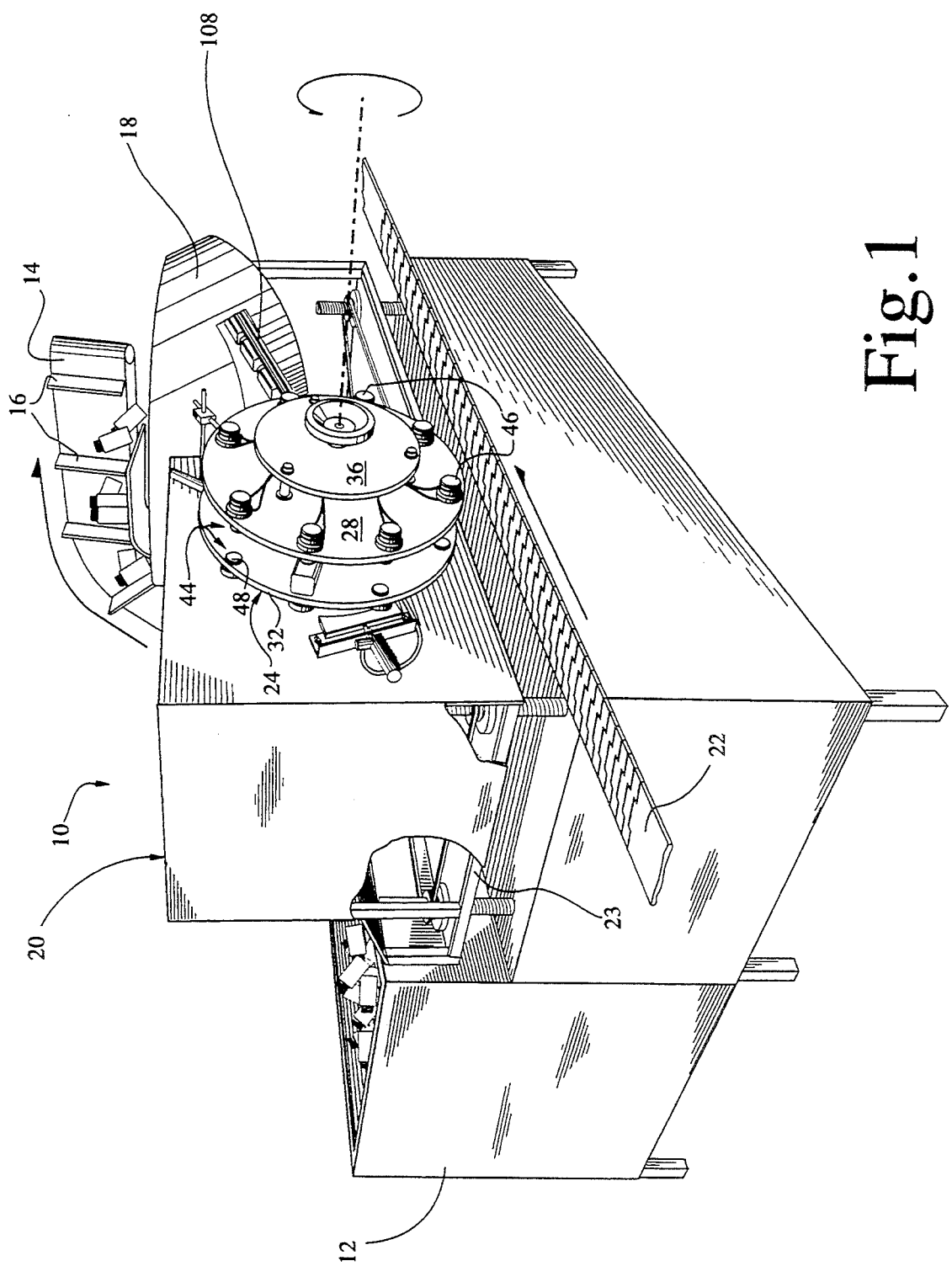
FIG. 1 is a perspective view of an apparatus for unscrambling containers constructed in accordance with the present invention.
Figure 2:
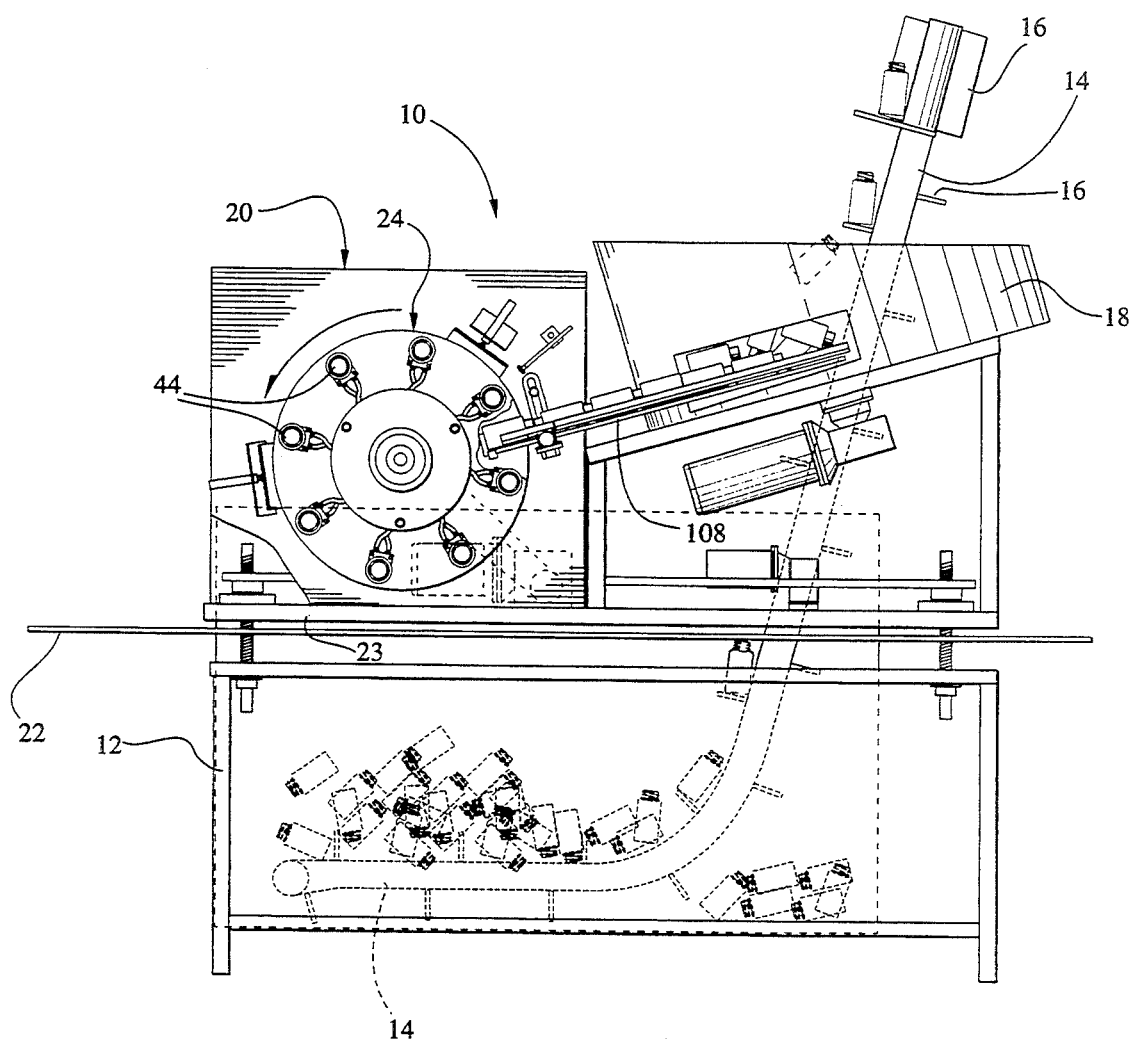
FIG. 2 is a side elevational view of the apparatus shown in FIG. 1, some elements being shown with parts broken away to illustrate underlying components.

With reference to FIGS. 1 and 2, the present invention provides an apparatus that unscrambles a population of containers and discharges a stream of containers having a uniform longitudinal orientation, namely the open end up. The apparatus, designated comprehensively by the reference numeral 10, comprises a storage bin 12 loaded with containers having a completely random orientation. An endless belt elevator 14 having closely spaced trays 16, elevates the empty containers and discharges them in the hopper of a pre-orienter 18 that essentially arranges the empty containers in serial order into one of two possible longitudinal orientations, namely neck-leading or neck-trailing. A pre-orienter manufactured by the Kalish company in Canada and commercialized under the trade name Kalisort 200 has been found satisfactory.

The storage bin 12, elevator 14 and pre-orienter 18 are peripheral units working in conjunction with a device 20 that is the principal subject of the present invention. Succinctly stated, the device 20 individually inspects the containers supplied from the pre-orienter 18 and inverts the ones having the improper longitudinal disposition. The containers are dispensed in serial order on a conveyor belt 22 and all have a uniform orientation, that is the open end facing up.

Figure 5:
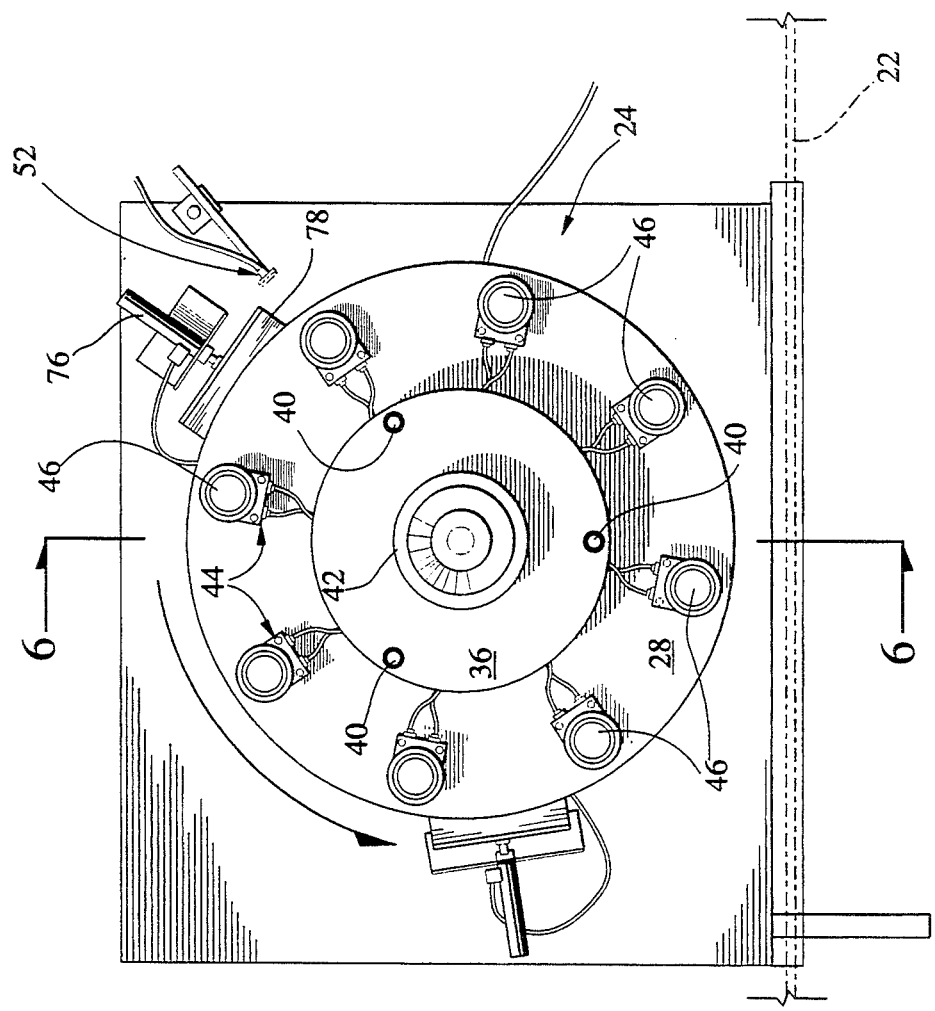
FIG. 5 is a side elevational view of the rotary carousel.
Figure 6:
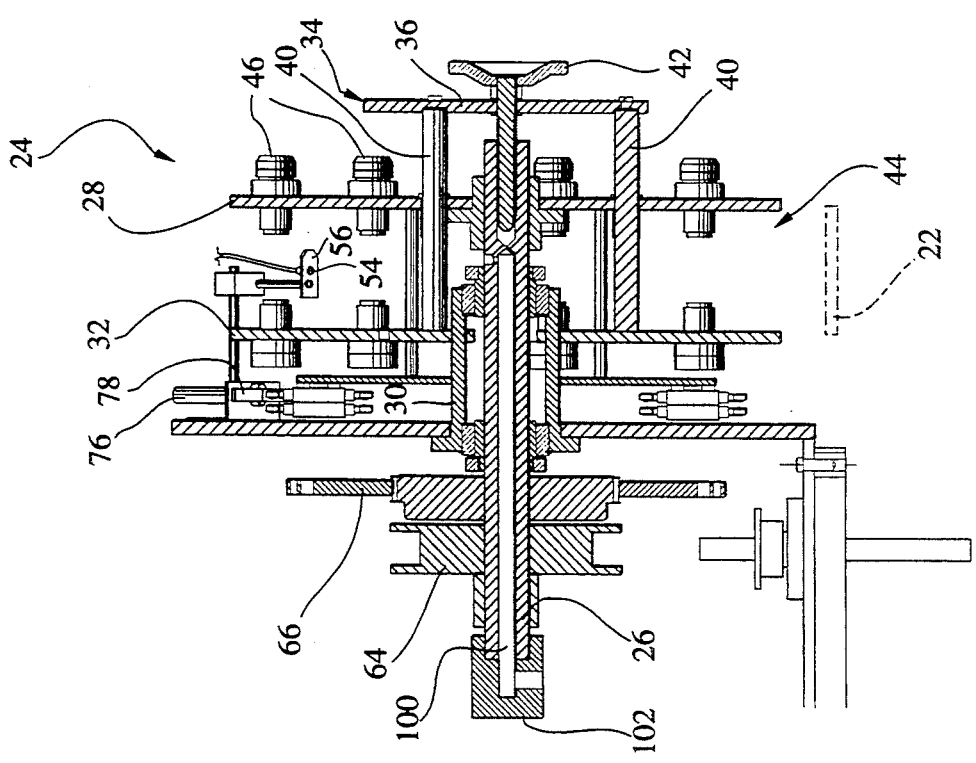
FIG. 6 is a cross-sectional view taken along lines 6—6 in FIG. 5.
Figure 7:
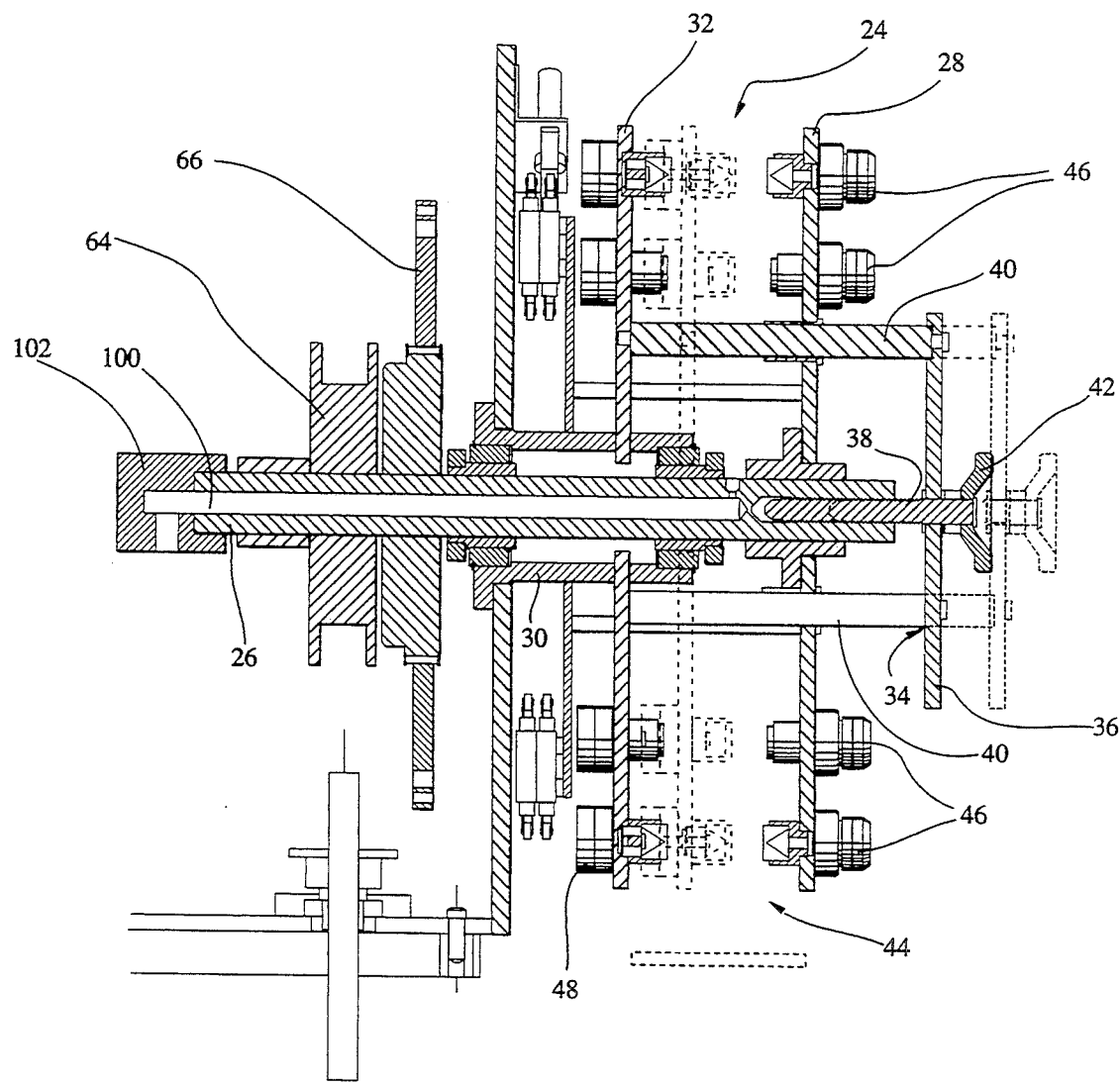
FIG. 7 is an enlarged vertical cross-sectional view of the rotary carousel, similar to FIG. 6, illustrating the mechanism to change the spacing between the carousel plates in order to adjust the apparatus for different container sizes.

The device 20 comprises a frame 23 holding a vertical carousel 24 that rotates about a generally horizontal axis. With reference to FIGS. 5, 6 and 7, the carousel 24 includes a main shaft 26 to which is keyed a circular plate 28. A hub 30 secured to the shaft 26 slidingly carries a circular plate 32 that is co-axial with the plate 28. The axial position of the plate 32 is adjustable by means of a spider assembly 34 that includes a frontal disc 36 mounted to the shaft 26 by means of a threaded rod 38. Legs 40 slidingly fitted in respective openings on the plate 28 are secured to the plate 32. By turning a handle 42 in the appropriate direction, the frontal disc 36 is displaced relative the shaft 26 to cause an axial relocation of the disc 32. This feature allows the vary the spacing between the plates 28 and 32 to adjust the carousel 24 for different container sizes.

Figure 4:
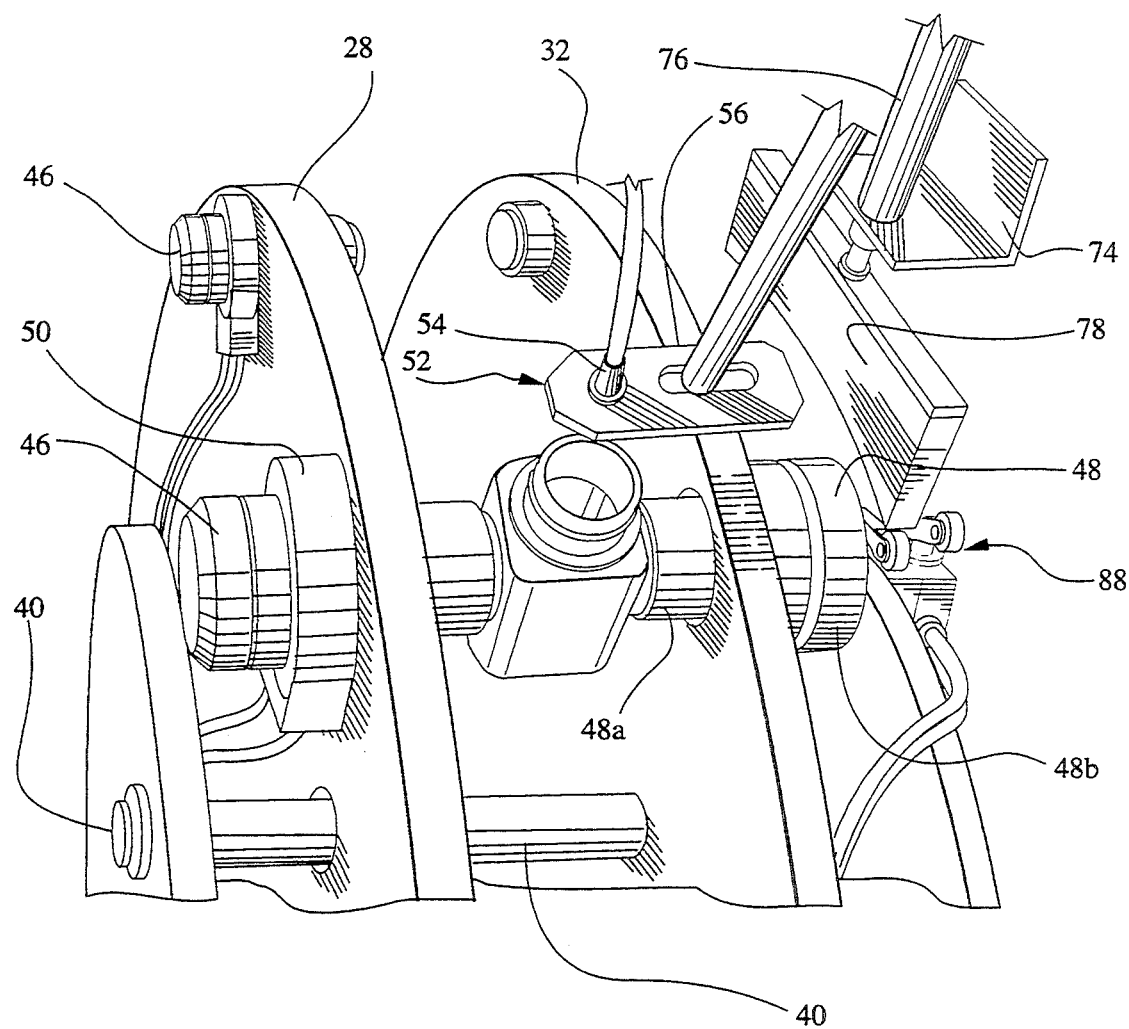
FIG. 4 is a fragmentary perspective view of an inspection station adjacent to the carousel provided to determine the longitudinal orientation of individual containers.

The carousel 24 carries a series of container handling stations 44 that individually transport containers along a common path of travel shaped as a sector of a circle and flip the containers that are found to be in the improper longitudinal disposition. Each container handling station 44 comprises a pair of opposite container engaging members 46 and 48 mounted to the circular plates 28 and 32, respectively. This feature is best shown in FIG. 4. The container engaging member 48 is a pneumatic linear movement actuator constituted by a piston/cylinder assembly. The piston 48a can be extended toward the companion container engaging member 46 by admitting working fluid within the cylinder 48b. The piston 46a is freely rotatable within the cylinder 48b. The purpose of this feature will become apparent as the description proceeds.

The container engaging member 46 is a semi-rotary actuator commercialized by the Fisto company (part number DFR-12-180P) including a pneumatic motor 50 rotating in angular steps of 180°. When working fluid is supplied to the motor 50, the rotor makes a half turn and then stops. The extent of the angular movement can be varied for adjustability purposes. The pneumatic motor 50 turns about an axis that is parallel to the rectilinear path of travel of the piston 48a. Preferably, the axis of rotation coincides with the longitudinal axis of the piston 48a.

Figure 3:
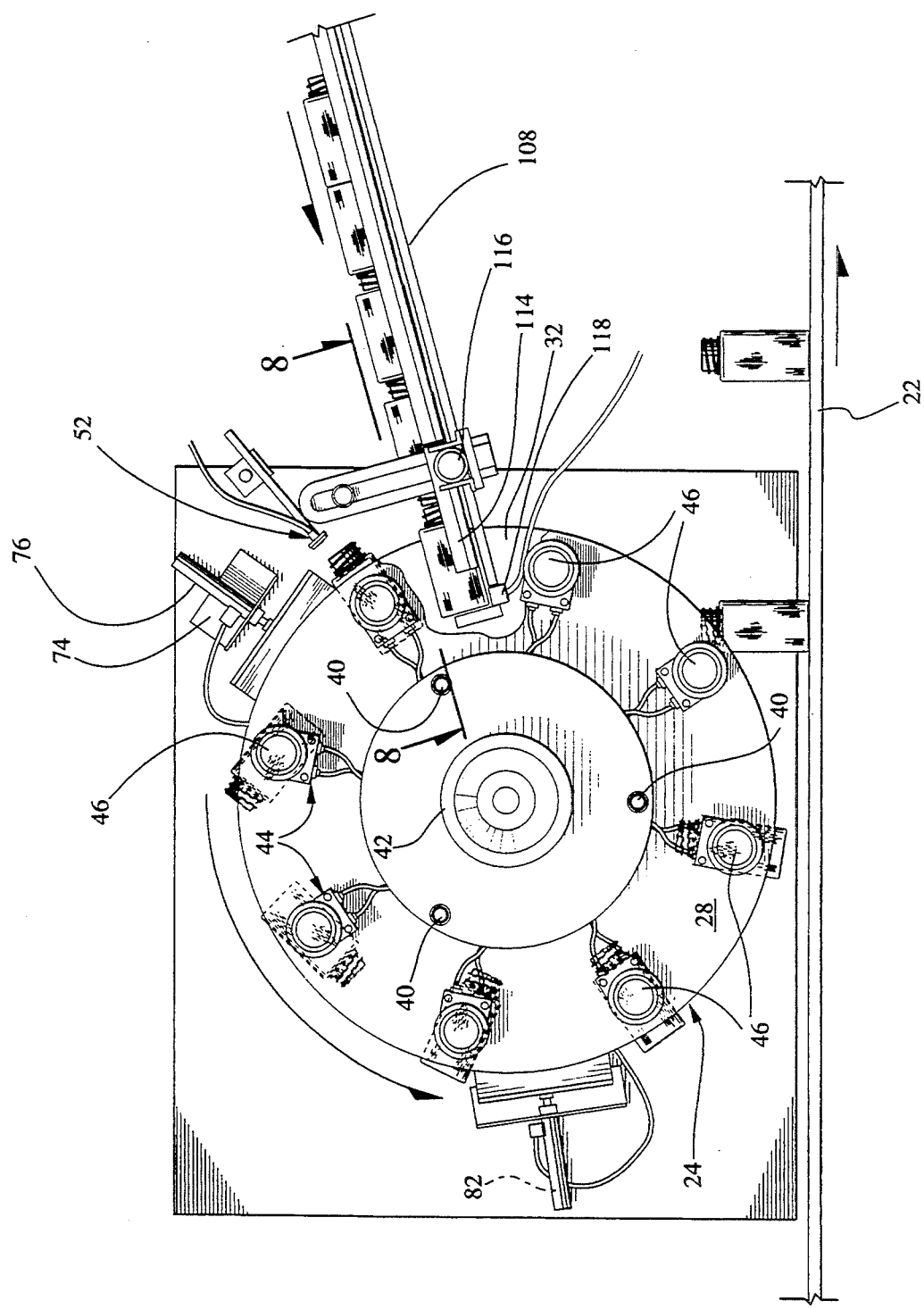
FIG. 3 is an enlarged side elevational view of a rotary carousel of the apparatus shown in FIGS. 1 and 2, one of the carousel plates being fragmented to better show an in-feed guide.

As best shown in FIGS. 3 and 4, an inspection station 52 is mounted near the periphery of the carousel 24. The inspection station 52 includes an optical system 54 constituted by source generating a highly focused light beam directed at the shaft 26 and a photocell that senses the intensity of reflected light. The optical system 54 is secured in place by a bracket 56.

The output condition of the photocell is used to determine the longitudinal orientation of the container that is being observed. The container shown in FIG. 4 has a mouth that faces the optical system 54. The light beam passing through the mouth is scattered inside the container and only a small portion is reflected toward the photocell. Accordingly, the amount of light sensed by the photocell is low. In contrast, when the container is in the inverted condition, the bottom wall presents a significantly more reflective surface. Thus, the photocell senses light having a higher intensity. In short, a high intensity reflection indicates a container whose bottom wall faces the inspection station 52. On the other hand, a low intensity reflection means a container whose neck faces the inspection station 52. The electric signals generated by the photocell are used to identify the containers that are improperly oriented. This information is required to perform a selective rotation of the containers to bring them all in the same longitudinal orientation.

Figure 10:
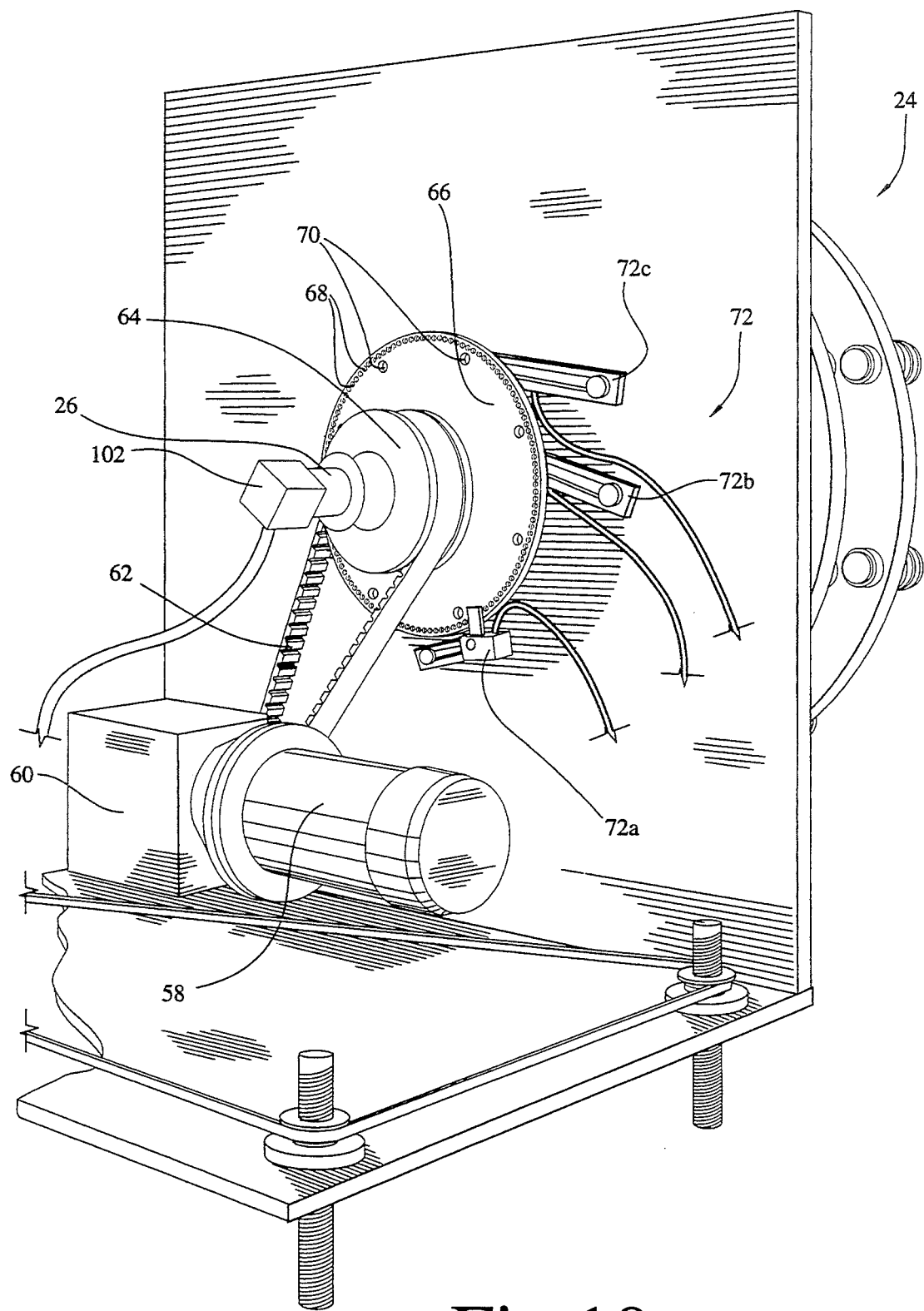
FIG. 10 is a perspective from the rear of the apparatus illustrating the main drive and a sensors array to detect the speed of rotation and the angular position of the rotary carousel.

The carousel 24 is rotated at constant speed by an electric motor 58, as best shown in FIG. 10. The driving engagement between the motor 58 and the shaft 26 is established by a gear box 60, cogged belt 62 and pulley 64 keyed on the shaft 26. Beside the pulley 64 is mounted a timing disc 66 that regulates the operation of the various components of the device 20. The timing disc 66 comprises a multitude of peripherally arranged and equidistant apertures 68. Another series of somewhat larger apertures 70 are provided radially inwardly from the apertures 68. The apertures 70 are at equal angular intervals and their number corresponds to the number of container handling stations 44.

An optical sensors array 72 responsive to the passage of the various apertures on the disc 66 generates output signals to timely actuate the various components of the device 20. More particularly, a sensor 72a is aligned with the path of travel of the apertures 68 and generates an electrical impulse every time an aperture 68 lines up with the photo-sensitive element of the sensor 72a. The period between consecutive pulsations is used to determine the precise speed of rotation of the carousel 24. This information is useful in controlling the drive of the conveyor belt 22 so that the linear speed of the conveyor belt 22 matches the linear speed of the containers released from the carousel 24. In this fashion, a smooth container transfer from the carousel to the conveyor is achieved with minimal wobbling.

Figure 11:
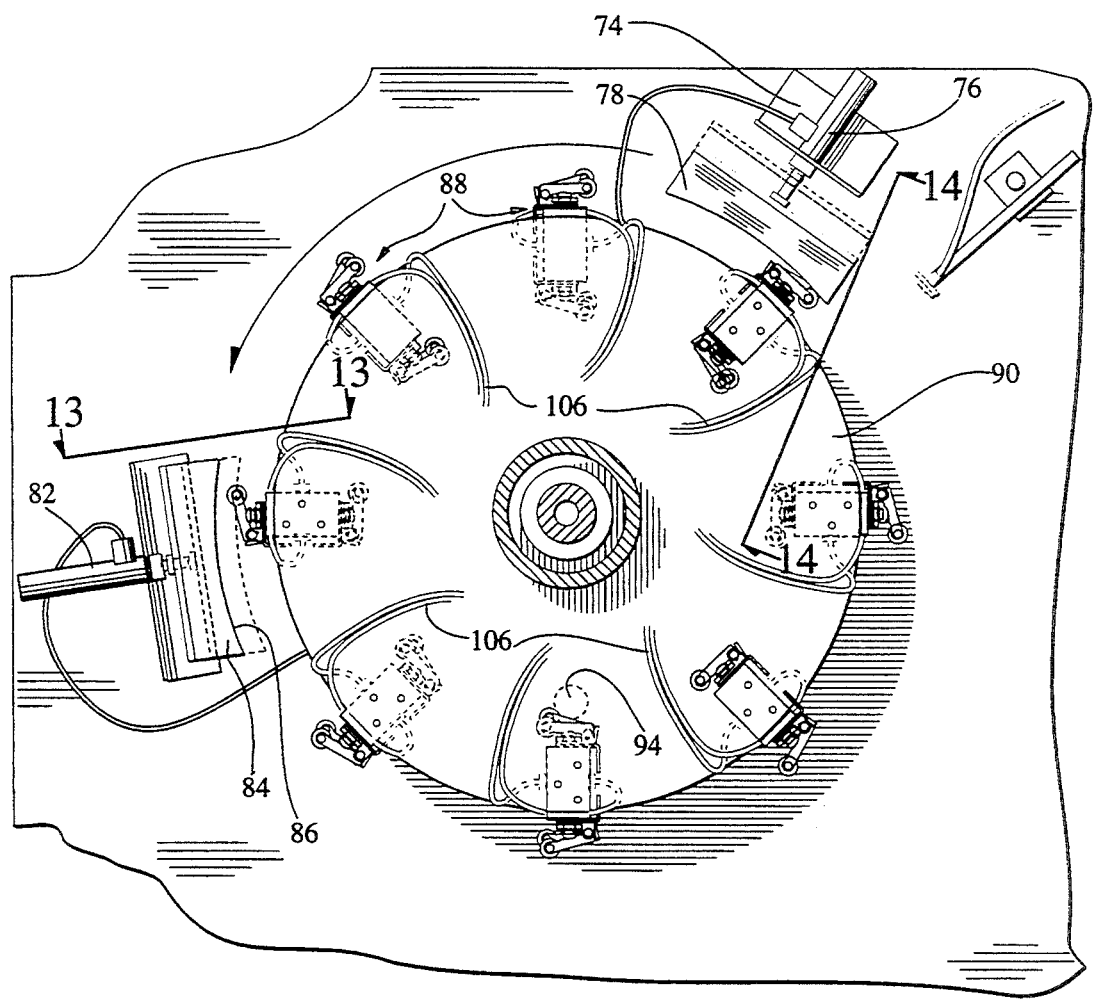
FIG. 11 is an elevational view of a rotary bank of pneumatic valves and associated cams arrangement to regulate the operation of the apparatus.
Figure 12:
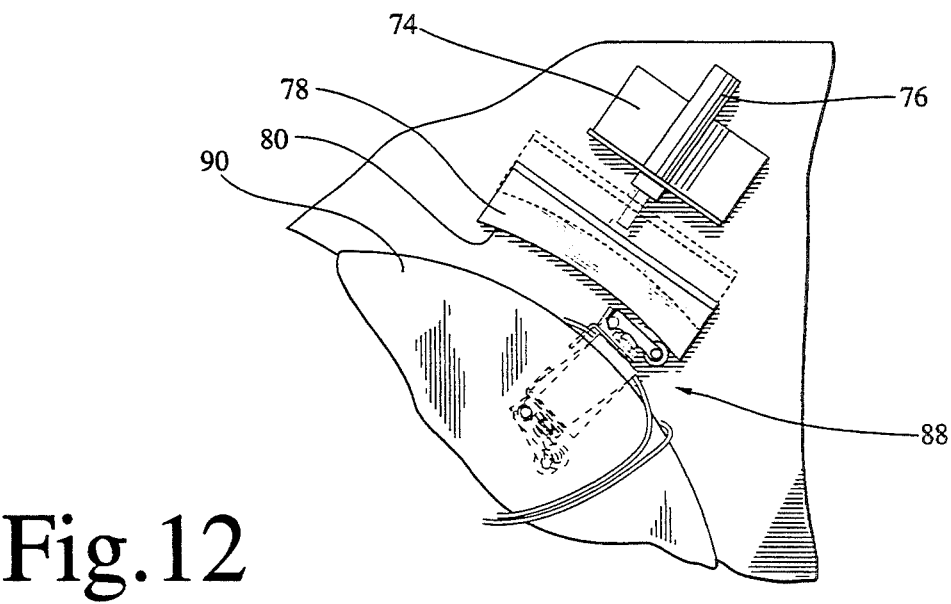
FIG. 12 is an enlarged fragmentary elevational view illustrating a pneumatic valve engaged by a movable cam.
Figure 13:
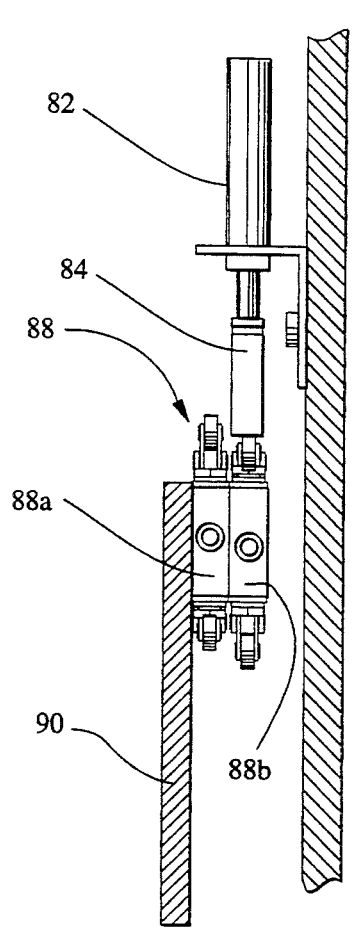
FIG. 13 is a cross-sectional view taken along lines 13—13 in FIG. 11.
Figure 14:
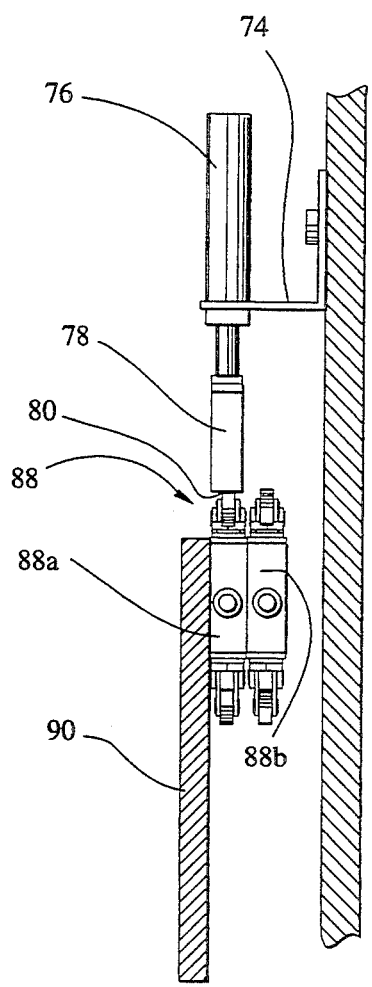
FIG. 14 is a cross-sectional view along lines 14—14 in FIG. 11.

A pair of optical sensors 72b and 72c generate information on the angular position of the carousel 24 to timely operate the pneumatic actuators of the container handling stations 44. Sensors 72b and 72c are optical devices generating an electric pulsation when an aperture 70 registers with their photosensitive elements. More specifically, sensor 72b controls a cam 74 (see FIGS. 3, 11, 12 and 13) that includes a pneumatic piston cylinder assembly 76 to which is mounted a block 78 having a concave outer surface 80. The sensor 72b triggers an electro-mechanical valve (not shown in the drawings) regulating the supply of working fluid to the piston/cylinder assembly 76. When any one of the apertures 70 lines up with the sensor 72b, the output condition of the sensor opens the valve in order to extend momentarily the block 78, as shown in solid lines in FIGS. 11 and 12. When the aperture 70 is no longer in alignment with the sensor 72b, the valve switches to retract the block 78. This is shown in dashed lines in FIGS. 11 and 12.

In a similar fashion, a sensor 72c actuates a cam 82 having a piston cylinder assembly to extend a block 84 with a concave surface 86.

The container engaging members 46 and 48 of each container handling station are directly controlled by a set 88 of mechanically operated pneumatic valves mounted at equidistant intervals on the periphery of a disc 90 secured to the shaft 26 and rotating therewith. Each set of valves 88 controls a unique container handling station 44 and it is angularly positioned upstream the container handling station by a distance corresponding to the spacing between two successive container handling stations.

The individual valves 88a and 88b of each set are toggle devices that can assume either one of two stable conditions. In the first stable condition, working fluid is admitted to the container engaging member controlled by the individual valve. In the other stable condition the pressure of working fluid in the container engaging member is depleted.

Figure 8:
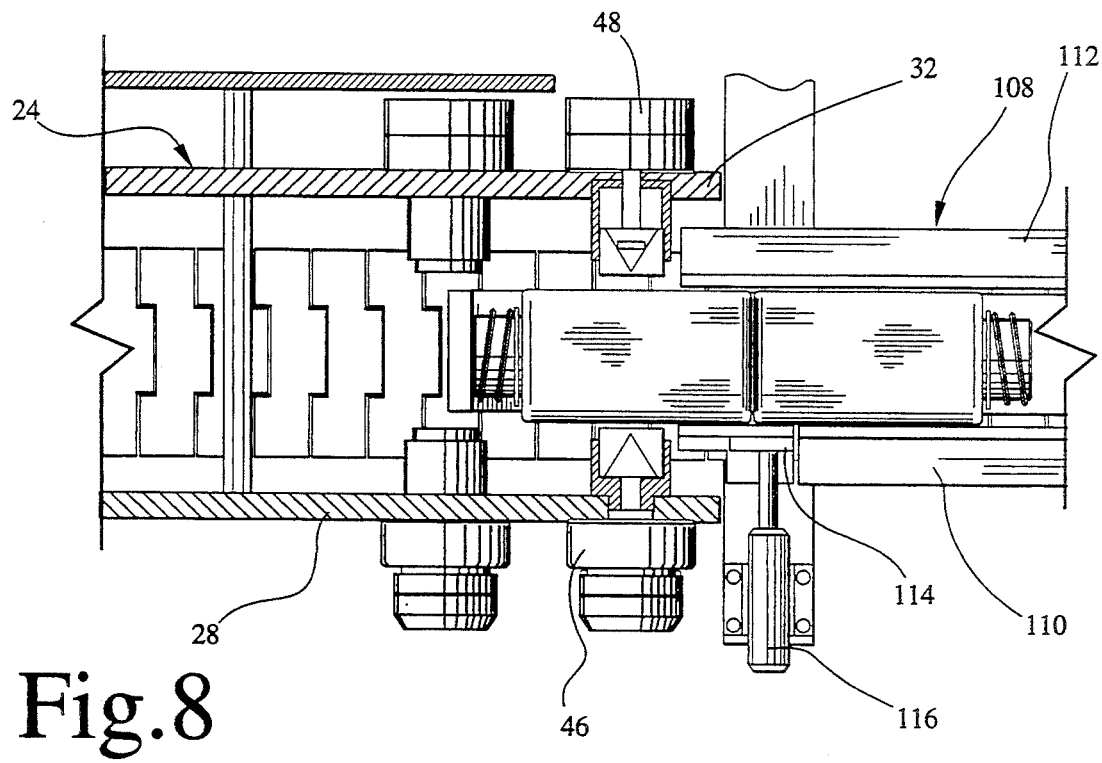
FIG. 8 is a cross-sectional view taken along lines 8—8 in FIG. 7 showing a retractable segment of the guide side wall provided to release the forwardmost container from the guide. The segment is shown in the extended position.
Figure 9:
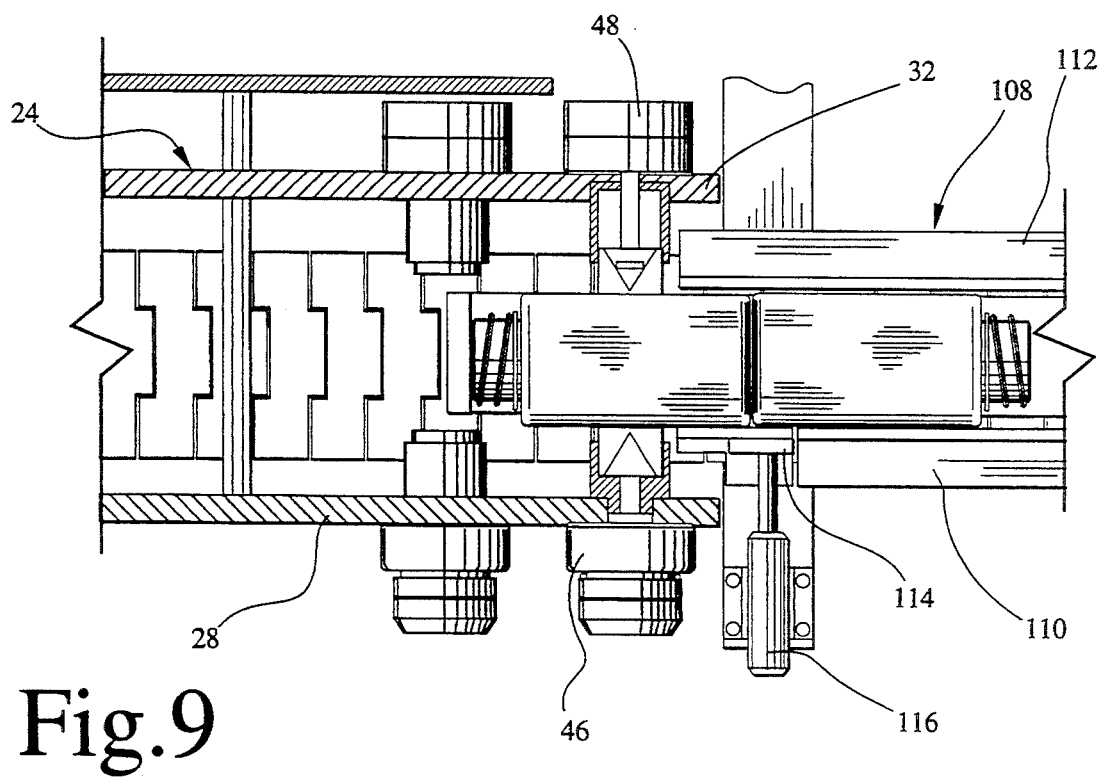
FIG. 9 is identical to FIG. 8 except it depicts the segment in the retracted position.

Referring back to FIGS. 1, 2, 3, 8 and 9, the pre-orienter 18 discharges empty containers on an inclined guide rail 108 that directs the containers to the carousel 24. The guide rail 108 extends between the plates 28 and 32 of the carousel so that the forwardmost container can be grabbed by a passing container handling station 44. The forwardmost container is presented by the guide rail 108 in such a way that its longitudinal axis is perpendicular to the shaft 26 and to the rectilinear path of travel along which the container engaging member 48 moves to clamp the container against the companion container engaging member 46. The guide rail 108 comprises elongated side walls 110 and 112 in a spaced apart relationship to define therebetween a path of travel for the containers discharged from the pre-orienter 18. The wall 110 ends with a movable segment 114 that can be retracted in order to facilitate the removal of the forwardmost container by the container handling station 44. The segment 114 is mounted to the piston rod of a pneumatic piston/cylinder assembly 116. In FIG. 8, the piston/cylinder assembly 16 is shown in the extended position, whereby the segment 114 is in alignment with the remaining of the side wall 110. FIG. 9 shows the segment 116 in the retracted position, allowing the forwardmost container to move laterally by a limited distance within the guide rail 108.

The piston/cylinder assembly 116 is controlled by the sensor 72b. When an aperture 70 on the timing disc 66 registers with the sensor 72b, the piston/cylinder assembly 116 is retracted to allow the lateral movement of the forwardmost container. By contrast, when no aperture registers with the sensor 72b, the piston/cylinder assembly 116 is extended to line-up with the remaining of the guide rail wall 110.

On its extremity the guide rail 108 is provided a photocell 118 (see FIG. 3) to determine if there is a container to be grabbed by the incoming container handling station 44. When a container is present, little or no light reaches the photocell 118. In contrast, a significant amount of light sensed by the photocell 118 means that the guide rail 108 is empty of containers.

Compressed air is admitted to the various pneumatic devices through a conduit 100 running through the shaft 26. A rotary coupling 102 establishes a fluid-communicative relationship with a source of compressed air (not shown in the drawings). The various pneumatic devices on the carousel 24 are connected to the conduit 100 by individual flexible conduits 106.

The operation of the device 20 is as follows. Prior to starting the device 20, an adjustment procedure is performed in order to set the width of the carousel 24 for the transverse dimension of the containers to be processed. The adjustment is performed by rotating the handle 42 in order to bring the plates 28 and 32 at a distance from one another such that when each container engaging member is extended, the container is securely held in the respective container handling station, and when the container engaging member 48 is retracted, the container drops from the container handling station.

When the adjustment procedure is completed, the device 20 and the peripheral units 14 and 22 are started. Empty containers in a random neck-leading and neck-trailing orientations are supplied from the pre-orienter 18 on the guide rail 108. At the exact moment a given container handling station 44 registers with the guide 108, an aperture 70 is in alignment with the sensor 72b. The electric signal generated by the sensor causes the extension of the piston/cylinder assembly 76 to toggle the valve 88a toward the opened position. This is best shown in FIGS. 11, 12, 13 and 14. The valve 88a controls the flow of working fluid to the linear movement actuator 48 of the container handling station that registers with the guide 108 and causes the extension of its piston 48a. Simultaneously, the piston/cylinder assembly 116 retracts the guide rail segment 114. This allows the forwardmost container on the guide rail 108 to move laterally under the effect of the extending piston 48a until it is clamped against the semi-rotary actuator 46. The container now firmly held is gently removed from the guide 108 due to the rotation of the carousel 24.

When the continuing rotation of the carousel 24 brings the aperture 70 out of alignment with the sensor 72b, the piston/cylinder assembly 76 is retracted. Still, the working pressure is maintained in the linear movement actuator 48 because the valve 88a is in a stable position. The retraction of the piston/cylinder assembly 76 is immediately followed by the extension of the piston cylinder 116 to bring the segment 114 in line with the rest of the guide rail side wall 110.

The container held in the container handling station then passes under the inspection station 52. The magnitude of reflected light enables to determine if the container is properly oriented. If the mouth faces the optical system 54, as shown in FIG. 4, the container is in an improper disposition and must be turned over. The low output condition of the optical system 54 enables the operation of the piston/cylinder assembly 82. The extension of the piston cylinder assembly 82 is triggered when an opening 70 registers with the sensor 72c. At that point, the valve 88b is toggled to admit working fluid to the motor 50. As a result, the container is rotated by 180°. The ability of the piston 48a of the companion container engaging member to turn in the respective cylinder enables the rotation to take place.

The continuing rotation of the carousel 24 brings the valves 88a and 88b in alignment with a stationary cam 94 that toggles both valves to the closed position. This depletes the pressure of working fluid in the linear actuator and causes retraction of the piston 46. As a result, the container is released on the conveyor belt 22.

The above described cycle is repeated for every container handling station. An important point is that if the inspection station 52 senses that the bottom wall of the container faces the optical system 54, the movement of the piston/cylinder assembly 82 is disabled. Therefore, no rotation of the container occurs.

FIG. 4 illustrates the continuing operation of the apparatus, depicting the rotation of the containers and the deposition of the oriented containers on the conveyor belt 22. The containers emerge as a continuous stream and they have all a uniform orientation.

The photocell 118 is a safety measure that enables the extension of the piston/cylinder assembly 76 and the retraction of the piston/cylinder assembly 116. If no container is present, the high output condition of the photocell 96 will prevent the container handling stations to close in an attempt to grasp the container.

The apparatus 20 is provided with an electronic controller that receives the signals generated by the various sensors, namely the optical system 54 at the inspection station, the optical sensors 72a, 72b and 72c operating in conjunction with the timing disc 66 and the photocell 118 on the in-feed guide. On the basis of the state of each signal, the controller actuates the electro-mechanical valves supplying to the piston/cylinder assemblies 76, 82 and 116. Preferably, the controller is a programmable unit that contains software to interpret the output condition of the various sensors and generate output signals to set the various electro-mechanical valves in the selected operative condition. It is not deemed necessary to describe in detail the structure and operation of such programmable controller because it is well-known to those skilled in the art.

The above description of a preferred embodiment should not be interpreted in any limiting manner since variations are possible without departing from the spirit of the invention. The scope of the invention is defined in the appended claims.

I claim:

1. An apparatus for successively unscrambling a population of containers, comprising:
   an in-feed station for receiving containers randomly arranged into one of at least two possible longitudinal orientations;
   a plurality of container handling stations in a spaced apart relationship movable along a common path of travel for transporting individual containers from said in-feed station to an output station and for altering the longitudinal orientation of selected containers during transport between said stations, each container handling station including:
a) a first container engaging member;
b) a second container engaging member movable relative said first container engaging member along a predetermined path of travel between an extended position and a retracted position, in said extended position said second container engaging member clamping a container against said first container engaging member, in said retracted position said second container engaging member being spaced from said first container engaging member by a distance sufficient to release the container from the container handling station; and
c) rotating means for rotating said container engaging members when said second container engaging member is in said extended position about an axis extending generally along said predetermined path of travel in order to alter the longitudinal orientation of the container held by said container engaging members,
an inspection station along said common path of travel for sensing the longitudinal orientation of individual containers transported along said common path of travel, the rotating means of said container engaging members being responsive to an output condition of said inspection station to rotate selected ones of the containers to a predetermined longitudinal orientation, whereby the containers released at said output station have a uniform longitudinal orientation.

2. An apparatus for unscrambling a population of containers as defined in claim 1, wherein predetermined path of travel is generally rectilinear, said axis coincides with a longitudinal axis of said first container engaging member and with said predetermined path of travel.

3. An apparatus for unscrambling a population of containers as defined in claim 1, comprising a rotatable carousel, said container handling stations being mounted to said rotatable carousel in angularly spaced apart positions.

4. An apparatus for unscrambling a population of containers as defined in claim 3, wherein said carousel includes a pair of support members axially spaced apart from one another, the container engaging members of each container handling station being mounted to a respective support member of said carousel.

5. An apparatus for unscrambling a population of containers as defined in claim 4, wherein said infeed station includes a guide extending between said support members for supplying containers in a random neck-leading and neck-trailing orientations, whereby a container handling station registering with said guide grips a forwardmost container in said guide by actuation of said second container engaging member toward said extended position.

6. An apparatus for unscrambling a population of containers as defined in claim 5, wherein said rotating means is in driving engagement said first container engaging member and causes rotation of said second container engaging member through the intermediary of a container therebetween.

7. An apparatus for unscrambling a population of containers as defined in claim 6, wherein said rotating means includes a pneumatic motor.

8. An apparatus for unscrambling a population of containers as defined in claim 5, wherein said first container engaging member includes a piston movable in a cylinder along said predetermined path of travel.

9. An apparatus for unscrambling a population of containers as defined in claim 8, wherein said piston is rotatable within said cylinder.

10. An apparatus for unscrambling a population of containers as defined in claim 8, wherein said piston in pneumatically actuated.

11. An apparatus for unscrambling a population of containers as defined in claim 1, wherein said inspection station includes an optical sensor.

12. An apparatus for unscrambling a population of containers as defined in claim 1, wherein said inspection station includes:
a light source for illuminating a longitudinal end portion of the container held by a container handling station registering with said inspection station; and
a sensor responsive to an intensity of light reflected from the longitudinal end portion of the container allowing to discriminate between the two possible longitudinal orientations thereof.

13. An apparatus for unscrambling a population of containers as defined in claim 1, wherein said output station includes a conveyor for transporting containers away from said apparatus.

14. An apparatus for unscrambling a population of containers as defined in claim 5, further comprising means to selectively vary a transverse dimension of a section of said guide located between said support members.

15. An apparatus for unscrambling a population of containers as defined in claim 14, comprising an actuator coupled to a wall of said guide for selectively displacing said wall between first and second positions, in said first position the forwardmost container in said guide being moveable laterally by the second container engaging member toward the first container engaging member in order to clamp the forwardmost container between the container engaging members, in said second position said wall substantially precluding a lateral movement of the forwardmost container in said guide.

16. An apparatus for unscrambling a population of containers, comprising:
an in-feed guide for directing along a predetermined path of travel containers randomly arranged into one of at least two possible longitudinal orientations;
a plurality of container handling stations in a spaced apart relationship movable along a common path of travel for transporting individual containers from said in-feed guide to an output station, each container handling station includes a pair of container engaging members capable of assuming either one of an opened condition and a closed condition, in said closed condition said container engaging members being in a close relationship for clamping a container therebetween, in said opened condition said container engaging members being separated by a distance sufficient to release the container from said container handling station, said in-feed guide extending between the container engaging members of respective container handling stations when the container handling stations register with said in-feed guide, whereby allowing the container handling stations to successfully grasp and remove containers from said guide by timed actuation of the respective container engaging members toward the closed condition, said container engaging members constituting means for altering the longitudinal orientation of selected containers during transport between said stations; and an inspection station along said common path of travel for sensing the longitudinal orientation of individual containers transported along said common path of travel, the container engaging members of said container handling stations being responsive to an output condition of said inspection station to place selected ones of the containers in a predetermined longitudinal orientation, whereby the containers released at said output station acquire an uniform longitudinal orientation.

17. An apparatus for unscrambling a population of containers as defined in claim 16, comprising a pair of support members rotatable about a common axis, said in-feed guide extending between said support members, the container engaging members of each container handling station being mounted to a respective support member.

18. An apparatus for unscrambling a population of containers as defined in claim 17, wherein a longitudinal axis of a forwardmost container in said in-feed guide is generally perpendicular to said common axis.

19. An apparatus for unscrambling a population of containers as defined in claim 4, wherein a longitudinal axis of a container clamped between said container engaging members is generally perpendicular to an axis of rotation of said container engaging members and to said rectilinear path of travel.

* * * * *